(12) United States Patent
Li et al.

(10) Patent No.: US 11,873,861 B2
(45) Date of Patent: Jan. 16, 2024

(54) FLANGED BEARING, ASSEMBLY, AND METHOD OF MAKING AND USING THE SAME

(71) Applicant: SAINT-GOBAIN PERFORMANCE PLASTICS CORPORATION, Solon, OH (US)

(72) Inventors: Gege Li, Shanghai (CN); Kaibo Su, Shanghai (CN); Hans-Juergen Jaeger, Huerth (DE); Jan Fluegge, Cologne (DE)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 17/111,885

(22) Filed: Dec. 4, 2020

(65) Prior Publication Data
US 2021/0172475 A1    Jun. 10, 2021

Related U.S. Application Data

(60) Provisional application No. 62/944,732, filed on Dec. 6, 2019.

(51) Int. Cl.
| | | |
|---|---|---|
| *F16C 17/10* | (2006.01) | |
| *F16C 33/20* | (2006.01) | |
| *F16C 33/14* | (2006.01) | |

(52) U.S. Cl.
CPC .............. *F16C 33/14* (2013.01); *F16C 17/10* (2013.01); *F16C 17/107* (2013.01); *F16C 33/206* (2013.01)

(58) Field of Classification Search
CPC ...... F16C 17/10; F16C 17/107; F16C 33/046; F16C 33/122; F16C 33/124; F16C 33/125;
(Continued)

(56) References Cited

U.S. PATENT DOCUMENTS

| 1,545,800 A | 9/1895 | Kempshall |
| 3,177,559 A | 4/1965 | Boschi et al. |

(Continued)

FOREIGN PATENT DOCUMENTS

| CN | 103518070 A | 1/2014 |
| CZ | 2007784 A3 | 5/2009 |

(Continued)

OTHER PUBLICATIONS

International Search Report and Written Opinion for PCT/US2020/063246, dated Mar. 26, 2021, 11 pages.
(Continued)

*Primary Examiner* — James Pilkington
(74) *Attorney, Agent, or Firm* — Abel Schillinger, LLP; Ann Palma

(57) ABSTRACT

A bearing including a sidewall including an open metal substrate at least partially embedded in a low friction material, the sidewall further including a generally cylindrical body; and a flange contiguous with and extending from an axial end of the generally cylindrical body, where at least one of 1) the flange includes a multiple wall construction including a plurality of flange sidewalls in contact with each other along at least 25% of a radial length of the flange, or 2) the sidewall or the flange comprises an outward conductive region and an inward conductive region.

13 Claims, 4 Drawing Sheets

(58) Field of Classification Search
CPC ...... F16C 33/127; F16C 33/20; F16C 33/201; F16C 33/203; F16C 33/205; F16C 33/206; F16C 33/24; F16C 33/28; F16C 41/002; F16C 33/14

See application file for complete search history.

(56) References Cited

U.S. PATENT DOCUMENTS

| | | |
|---|---|---|
| 3,311,432 A | 3/1967 | Cowles |
| 3,355,695 A | 11/1967 | Overesch |
| 3,921,225 A | 11/1975 | Suska |
| 3,957,939 A | 5/1976 | Voaden |
| 4,116,019 A | 9/1978 | Welschof |
| 4,721,406 A | 1/1988 | Davis |
| 5,075,928 A | 12/1991 | Bobrowski |
| 5,112,146 A | 5/1992 | Stangeland |
| 5,273,369 A | 12/1993 | Strobl |
| 5,385,413 A | 1/1995 | Murphy et al. |
| 5,707,193 A | 1/1998 | Hasegawa |
| 5,906,029 A | 5/1999 | Fox |
| 6,164,830 A | 12/2000 | Nitzsche et al. |
| 6,231,239 B1 | 5/2001 | Damour et al. |
| 6,376,952 B1 | 4/2002 | Stenta |
| 6,669,370 B1 | 12/2003 | Storch et al. |
| 7,661,960 B2 | 2/2010 | Tanoi et al. |
| 8,505,164 B2 | 8/2013 | Katou |
| 8,746,981 B2 | 6/2014 | Hartmann |
| 8,984,817 B2 | 3/2015 | Weiden et al. |
| 9,022,656 B2 | 5/2015 | Burgeff et al. |
| 9,022,683 B2 | 5/2015 | Nais et al. |
| 9,297,416 B2 * | 3/2016 | Ziegler .............. B32B 15/082 |
| 9,343,862 B2 | 5/2016 | Zink et al. |
| 9,543,801 B2 | 1/2017 | Horng |
| 10,087,984 B2 * | 10/2018 | Hunter ................. F16C 17/10 |
| 10,738,519 B2 | 8/2020 | Eisenschenk et al. |
| 11,428,267 B2 | 8/2022 | Haines et al. |
| 2005/0034267 A1 | 2/2005 | Fukushima et al. |
| 2006/0228174 A1 | 10/2006 | Woodhead et al. |
| 2009/0224618 A1 | 9/2009 | Bhatti |
| 2011/0002565 A1 | 1/2011 | Ambroise et al. |
| 2011/0076096 A1 | 3/2011 | Slayne et al. |
| 2011/0150375 A1 | 6/2011 | Jaeger et al. |
| 2012/0005859 A1 | 1/2012 | Herglotz et al. |
| 2012/0106882 A1 | 5/2012 | Ponnouradjou et al. |
| 2012/0128280 A1 | 5/2012 | Ortiz et al. |
| 2012/0240350 A1 * | 9/2012 | Natu .................. F16C 17/24 16/2.2 |
| 2013/0067689 A1 | 3/2013 | Mitchell et al. |
| 2013/0315654 A1 | 11/2013 | Nias et al. |
| 2014/0044385 A1 * | 2/2014 | Andelkovski ......... F16C 33/208 384/276 |
| 2014/0185164 A1 | 7/2014 | Nias et al. |
| 2015/0063734 A1 | 3/2015 | Duch |
| 2015/0114549 A1 | 4/2015 | Slayne et al. |
| 2015/0285306 A1 | 10/2015 | Akyol et al. |
| 2017/0002858 A1 | 1/2017 | Hunter et al. |
| 2017/0227047 A1 | 8/2017 | Fujiwara |
| 2017/0363140 A1 | 12/2017 | Hartmann et al. |
| 2019/0093401 A1 | 3/2019 | Hoenig et al. |
| 2019/0190345 A1 | 6/2019 | Childs |
| 2019/0360521 A1 | 11/2019 | Schmidt |
| 2020/0173485 A1 | 6/2020 | Kuemmel et al. |
| 2021/0140486 A1 | 5/2021 | Haines et al. |
| 2023/0027214 A1 | 1/2023 | Zlebek et al. |
| 2023/0193952 A1 | 6/2023 | Dimartino et al. |

FOREIGN PATENT DOCUMENTS

| | | |
|---|---|---|
| DE | 2818014 A1 | 11/1979 |
| DE | 4425491 A1 | 2/1995 |
| DE | 19626279 A1 | 1/1998 |
| DE | 19960736 C1 | 7/2001 |
| DE | 202005005827 U1 | 6/2005 |
| DE | 102007052104 A1 | 6/2009 |
| DE | 102011077728 A1 | 12/2012 |
| DE | 102011087530 A1 | 6/2013 |
| DE | 102018131181 B3 | 2/2020 |
| DE | 102019110734 A1 | 10/2020 |
| EP | 0307112 A2 | 3/1989 |
| EP | 1582275 B1 | 5/2007 |
| EP | 2058536 A1 | 5/2009 |
| EP | 2476566 A1 | 7/2012 |
| EP | 2480797 B1 | 5/2016 |
| EP | 3498956 A1 | 6/2019 |
| GB | 1237075 A | 6/1971 |
| GB | 2237059 A | 4/1991 |
| JP | S51158950 U | 12/1976 |
| JP | 3009484 U | 4/1995 |
| JP | H09242757 A | 9/1997 |
| JP | H11132236 A | 5/1999 |
| JP | 2000027904 A | 1/2000 |
| JP | 2000046056 A | 2/2000 |
| JP | 2003278760 A | 10/2003 |
| JP | 2003278761 A | 10/2003 |
| JP | 2014505836 A | 3/2014 |
| JP | 2014509721 A | 4/2014 |
| JP | 2015230628 A | 12/2015 |
| JP | 2016169816 A | 9/2016 |
| JP | 2018519486 A | 7/2018 |
| KR | 20170045456 A | 4/2017 |
| WO | 2005105431 A1 | 11/2005 |
| WO | 2016060660 A1 | 4/2016 |
| WO | 2016156507 A1 | 10/2016 |
| WO | 2017103117 A1 | 6/2017 |
| WO | 2019063524 A1 | 4/2019 |
| WO | 2020245129 A1 | 12/2020 |
| WO | 2021089804 A1 | 5/2021 |
| WO | 2021113599 A1 | 6/2021 |

OTHER PUBLICATIONS

International Search Report and Written Opinion for PCT/EP2018/075911, dated Nov. 21, 2018, 13 pages.

International Search Report and Written Opinion for PCT/EP2020/081326, dated Feb. 18, 2021, 14 pages.

Smith J W: "Presenting examples of Motor-Overload-Protection applications from the Appliance and Automotive industries", IEEE Industry Applications Magazine, IEEE Service Center, Piscataway, NJ, US, vol. 8, No. 5, Sep. 1, 2002 (Sep. 1, 2002), pp. 74-82, XP011093338, ISSN: 1077-2618, DOI: 10. 1109/MIA.2002. 1028393 p. 74-p. 82; figures 1-17.

International Search Report and Written Opinion for PCT/EP2022/069920, dated Nov. 2, 2022, 17 pages.

International Search Report and Written Opinion for PCT/US2022/081992, dated Apr. 21, 2023, 13 pages.

* cited by examiner

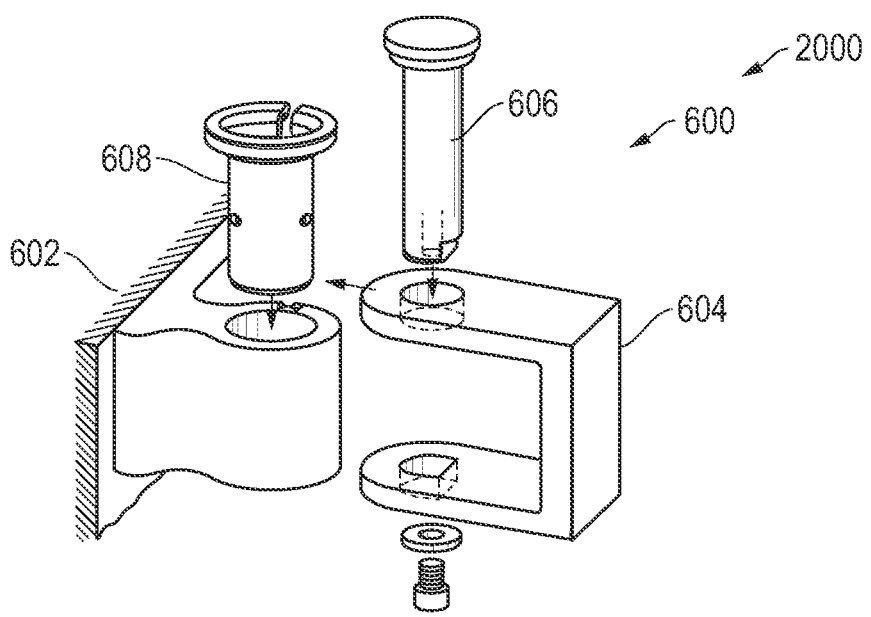
FIG. 6
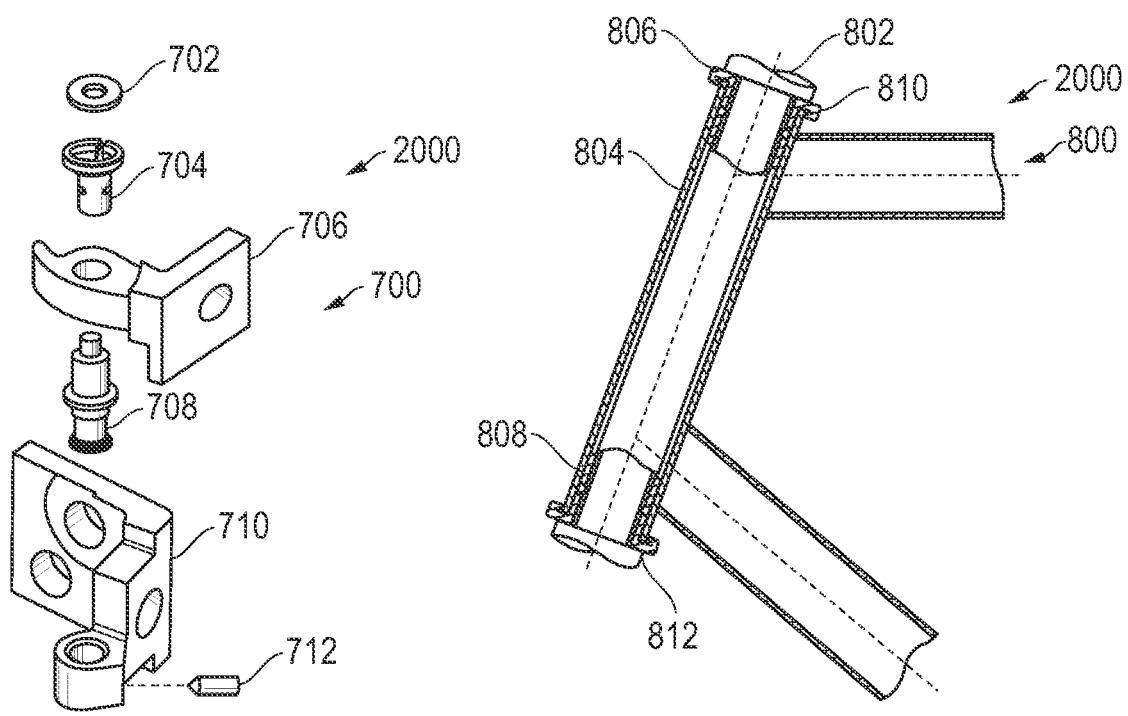
FIG. 7
FIG. 8

FLANGED BEARING, ASSEMBLY, AND METHOD OF MAKING AND USING THE SAME

CROSS-REFERENCE TO RELATED APPLICATION(S)

This application claims priority under 35 U.S.C. § 119(e) to U.S. Provisional Application No. 62/944,732, entitled "FLANGED BEARING, ASSEMBLY, AND METHOD OF MAKING AND USING THE SAME," by Gege L I et al., filed Dec. 6, 2019, which is assigned to the current assignee hereof and incorporated herein by reference in its entirety.

FIELD OF THE DISCLOSURE

This disclosure, in general, relates to bearings, in particular plain bearings with at least one of a flange or multilayer bearing sidewall and method of production and assembly thereof.

BACKGROUND

Bearings generally provide a slip interface between mated components. Bearings can include a low friction material interfacing between two or more components, which are movable with respect to one another in an assembly. Further, some bearings include flanged bearings, which comprise either one or two flanges. Bearings may be used in assemblies with applications in the vehicle industry, for example, for door, hood, and engine compartment hinges, seats, steering columns, flywheels, balancer shaft bearings, etc., or may be used for non-automotive applications. Some hinge assemblies may include a coating including, but not limited to, paint coatings that may be done through e-painting or other methods. In some areas, the bearing and other components in the hinge assembly may include gaps that may lead to over coating which results in corrosion and debris/contamination in the hinge assembly. Therefore, despite advances in the art, there is an ongoing need for improved bearings that have a longer lifetime, improved effectiveness, improved corrosion protection, and overall improved performance within an assembly.

BRIEF DESCRIPTION OF THE DRAWINGS

The present disclosure may be better understood, and its numerous features and advantages made apparent to those skilled in the art by referencing the accompanying drawings.

FIG. 6 is an illustration of a bearing within an assembly according to a number of embodiments;

FIG. 7 is an illustration of a bearing within an assembly according to a number of embodiments; and FIG. 8 is an illustration of a bearing within an assembly according to a number of embodiments;

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the bearing and bearing assembly arts.

Figure 1:
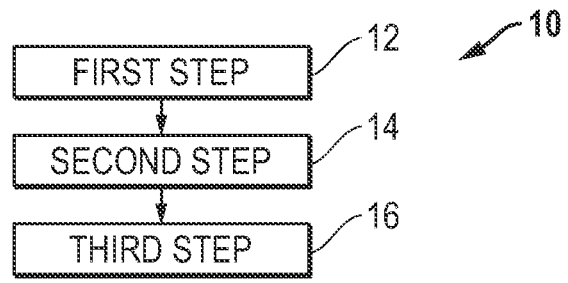
FIG. 1 is an illustration of a stepwise manufacturing process.

For purposes of illustration, FIG. 1 includes a diagram showing a manufacturing process 10 for forming a bearing. The manufacturing process 10 may include a first step 12 of providing a base material, a second step 14 of coating the base material with a low friction coating to form a composite material and a third step 16 of forming the composite material into a bearing.

Referring to the first step 12, the base material may be a substrate. In an embodiment, the substrate can at least partially include a metal support. According to certain embodiments, the metal support may include iron, copper, titanium, bronze, tin, nickel, aluminum, alloys thereof, or may be another type of metal. More particularly, the substrate can at least partially include a steel, such as, a stainless steel, carbon steel, or spring steel. For example, the substrate can at least partially include a 301 stainless steel. The 301 stainless steel may be annealed, ¼ hard, ½ hard, ¾ hard, or full hard. In a number of embodiments, the base material may be a metal support coated by another metal, which may improve corrosion resistance or friction properties.

The substrate may include an open metal substrate. The open metal substrate may include a metal with a plurality of apertures in a radial surface of the substrate. The radial surface of the substrate may have a radial surface area and the plurality of apertures may have a void area defined as the surface area the plurality of apertures occupy in the radial surface area of the substrate. The open metal substrate may be defined as having a void area of at least 30% of the surface area of the radial surface of the open metal surface. In a number of embodiments, the open metal substrate may have a void area of at least 30% of the surface area of the radial surface of the open metal surface, such as at least 40% of the radial surface area of the open metal substrate, such as at least 50% of the radial surface area of the open metal substrate, such as at least 60% of the radial surface area of the open metal substrate, such as at least 70% of the radial surface area of the open metal substrate, such as at least 80% of the radial surface area of the open metal substrate, or such as at least 90% of the radial surface area of the open metal substrate. The void area may cover no greater than 99% of the radial surface area of the open metal substrate, such as no greater than 95% of the radial surface area of the open metal substrate, no greater than 90% of the radial surface area of the open metal substrate, no greater than 80% of the radial surface area of the open metal substrate, no greater than 70% of the radial surface area of the open metal substrate, no greater than 60% of the radial surface area of the open metal substrate, no greater than 50% of the radial surface area of the open metal substrate, no greater than 40% of the radial surface area of the open metal substrate, or no greater than 30% of the radial surface area of the open metal substrate.

The open metal substrate can include a woven or non-woven metal, an expanded metal grid, or a perforated metal sheet, or may include another type of metal including a plurality of apertures in its radial surface.

In an embodiment, the open metal substrate may include a woven metal mesh. Woven metal meshes, may be manufactured to include filaments such as a first filament and a second filament interwoven to produce apertures or voids. In one embodiment, the first filament and the second filament can have the same thickness. Alternatively, they may have different thicknesses. The woven metal mesh may have various woven types including, but not limited to, woven net, inter-crimped, lock crimped, plain weaved, flat top woven, flat stamped, or welded. The woven metal mesh may be square weaved, Dutch weaved, twill Dutch weaved, reverse Dutch weaved, or may be woven another way.

In an embodiment, the open metal substrate may include a non-woven metal mesh. Non-woven metal meshes, may be manufactured to include filaments such as a first filament and a second filament that are bonded together by chemical, mechanical, heat, or solvent treatment produce apertures or voids. In one embodiment, the first filament and the second filament can have the same thickness. Alternatively, they may have different thicknesses.

In an embodiment, the open metal substrate may include an expanded metal grid. Expanded metal grids may be manufactured by several different processes. For example, a plurality of apertures may be stamped into a metal sheet to produce a number of filaments and voids in the metal sheet. Stamping may involve either material removal or the creation of apertures within the sheet without significant material removal. In a number of embodiments, the expanded metal grid may be not woven but prepared from a sheet having planar major surfaces. The expanded sheets may have a planarity of at least one major surface that is maintained after stretching the metal and creating a metal grate.

In an embodiment, the apertures may be equally spaced apart from one another. In another embodiment, the apertures may be spaced apart from one another at different spatial intervals. In certain embodiments, the sheet may be expanded, or stretched, during stamping. For example, a serrated press may reciprocate between open and closed positions, forming the apertures and simultaneously creating an undulating surface profile of the sheet. Alternatively, the sheet may be stamped to form the apertures in a first step and then be expanded in a second step. Expansion of the sheet can occur in a single direction or in a bi- or other multi-directional manner. For example, in an embodiment, the sheet may be expanded in opposing directions, e.g., a first direction and a second direction offset from the first direction by 180°. In another embodiment, the sheet may be bi-directionally expanded, e.g., expanded in a first, second, third, and fourth directions. The first and third directions may be opposite one another and the second and fourth directions may be opposite one another. More particularly, each of the first and third directions may be offset by 90° from each of the second and fourth directions.

In an embodiment, the open metal substrate may include a perforated metal sheet. Perforated metal sheet may be manufactured by several different processes. For example, a plurality of apertures may be formed into a metal sheet to produce a number of filaments and voids in the metal sheet. The apertures may be formed via cutting, drilling, stamping, sawing, shearing, turning, milling, grinding, burning, hydroforming, abrasive flow machining, photochemical machining, electric discharge, filing, or may be formed a different way.

Figure 2A:
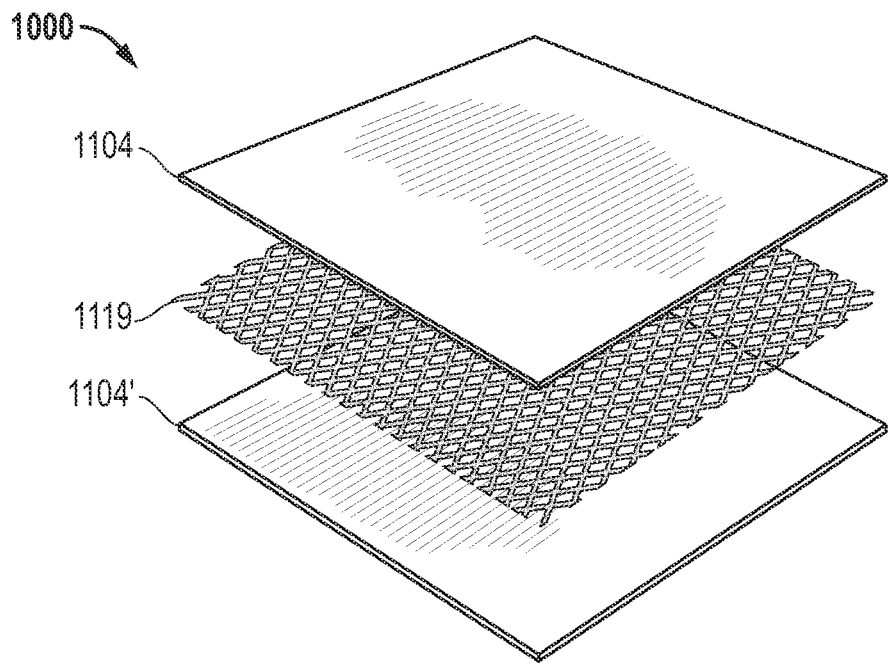
FIG. 2A is an illustration of the layer structure of a bearing according to a number of embodiments.
Figure 2B:
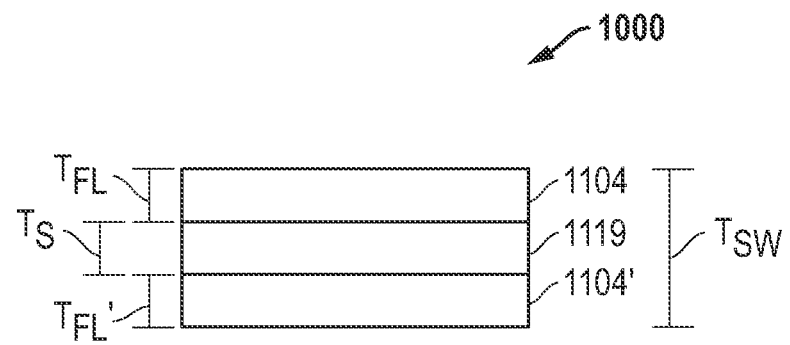
FIG. 2B is an illustration of the layer structure of a bearing according to a number of embodiments.

FIGS. 2A-2B include illustrations of the composite material 1000 that may be formed according to first step 12 and second step 14 of the forming process 10. For purposes of illustration, FIGS. 2A-2B show the layer by layer configuration of a composite material 1000 after second step 14. In a number of embodiments, the composite material 1000 may include a substrate 1119 (i.e., the base material noted above and provided in the first step 12) and a low friction layer 1104 (i.e., the low friction coating applied in second step 14). In a number of embodiments, the substrate 1119 may extend at least partially along a length of the composite material 1000. As shown in FIG. 2A, the low friction layer 1104 can be coupled to at least a region of the substrate 1119. In a particular embodiment, the low friction layer 1104 can be coupled to a surface of the substrate 1119 so as to form a low friction interface with another surface of another component. The low friction layer 1104 can be coupled, laminated to, or have the substrate 1119 embedded within it such that the low friction layer may be present on or overlies the radially inner surface of the substrate 1119 so as to form a low friction interface with another surface of another component. The low friction layer 1104 can be coupled, laminated to, or have the substrate 1119 embedded within it such that the low friction layer may be present on or overlies the radially outer surface of the substrate 1119 so as to form a low friction interface with another surface of another component. In other embodiments, the low friction layer 1104 can be coupled, laminated to, or have the substrate 1119 embedded within it such that the low friction layer may be present on or overlies both the radially inner surface and the radially outer surface of the substrate 1119 so as to form a low friction interface with another surface of another component. In an embodiment, the substrate 1119, as an open metal substrate, may be partially embedded within the low friction layer 1104. In an embodiment, the substrate 1119, as an open metal substrate, may be fully embedded within the low friction layer 1104 such that the low friction material extends along at least some portions of the substrate 1119 along the radially outer surface and the radially inner surface of the substrate 1119. In an embodiment, as shown best in FIG. 2B, the substrate 1119, as an open metal substrate, may be at least partially embedded within the low friction layer 1104 so as to form a first low friction layer 1104, and a second low friction layer 1104'. In some embodiments, the composite material 1000 can optionally include a second substrate 1119'. In one embodiment, the second substrate 1119' can be a metal containing substrate, such as a steel substrate, and may include an open metal substrate, as described above.

The substrate 1119 can have a thickness, Ts, of between about 10 microns to about 2000 microns, such as between about 50 microns and about 1500 microns, such as between about 100 microns and about 1000 microns, such as between about 150 microns and about 500 microns. In a number of embodiments, the substrate 1119 may have a thickness, Ts, of between about 200 and 600 microns. In a number of embodiments, the substrate 1119 may have a thickness, Ts, of between about 250 and 450 microns. It will be further appreciated that the thickness, Ts, of the substrate 1119 may be any value between any of the minimum and maximum values noted above. The thickness of the substrate 1119 may be uniform, i.e., a thickness at a first location of the substrate 1119 can be equal to a thickness at a second location therealong. The thickness of the substrate 1119 may be non-uniform, i.e., a thickness at a first location of the substrate 1119 can be different than a thickness at a second location therealong.

In a number of embodiments, the low friction layer 1104 can include a low friction material. Low friction materials may include, for example, a polymer, such as a polyketone, a polyaramid, a polyphenylene sulfide, a polyethersulfone, a polypheylene sulfone, a polyamideimide, ultra high molecular weight polyethylene, a fluoropolymer, a polybenzimidazole, a polyacetal, polybutylene terephthalate (PBT), polyethylene terephthalate (PET), a polyimide (PI), polyetherimide, polyetheretherketone (PEEK), polyethylene (PE), a polysulfone, a polyamide (PA), polyphenylene oxide, polyphenylene sulfide (PPS), a polyurethane, a polyester, a liquid crystal polymer (LCP), or any combination thereof. In an example, the low friction layer 1104 includes polyketone, such as polyether ether ketone (PEEK), polyether ketone, polyether ketone ketone, polyether ketone ether ketone, a derivative thereof, or a combination thereof. In an additional example, the low friction layer 1104 may include an ultra high molecular weight polyethylene. In another example, the low friction layer 1104 may include a fluoropolymer including fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), or ethylene chlorotrifluoroethylene copolymer (ECTFE). The low friction layer 1104 may include a solid based material including lithium soap, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, platinum, titanium, tungsten, iron, bronze, steel, spring steel, stainless steel), a metal alloy (including the metals listed), an anodized metal (including the metals listed) or any combination thereof. Fluoropolymers may be used according to particular embodiments.

In a number of embodiments, the low friction layer 1104 may further include fillers, including glass, carbon, silicon, PEEK, aromatic polyester, bronze, fluoropolymers, thermoplastic fillers, aluminum oxide, polyamidimide (PAI), PPS, polyphenylene sulfone (PPSO$_2$), LCP, aromatic polyesters, molybdenum disulfide, tungsten disulfide, graphite, graphene, expanded graphite, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof. Fillers can be in the form of beads, fibers, powder, mesh, or any combination thereof. The fillers may be at least 10 wt % based on the total weight of the low friction layer, such as at least 15 wt %, 20 wt %, 25 wt % or even 30 wt %. In a number of embodiments, the low friction layer 1104 may have an electric conductivity lower than the electric conductivity of the substrate 1119.

In an embodiment, the low friction layer 1104 (or second low friction layer 1104') can have a thickness, $T_{FL}$ ($T_{FL}'$), of between about 1 micron to about 500 microns, such as between about 10 microns and about 400 microns, such as between about 30 microns and about 300 microns, such as between about 50 microns and about 250 microns. In a number of embodiments, the low friction layer 1104 (or second low friction layer 1104') may have a thickness, $T_{FL}$ ($T_{FL}'$), of between about 100 and 350 microns. It will be further appreciated that the thickness, $T_{FL}$ ($T_{FL}'$), of the low friction layer 1104 (or second low friction layer 1104') may be any value between any of the minimum and maximum values noted above. The thickness of the low friction 1104 (or second low friction layer 1104') may be uniform, i.e., a thickness at a first location of the low friction layer 1104 can be equal to a thickness at a second location therealong. The thickness of the low friction 1104 (or second low friction layer 1104') may be non-uniform, i.e., a thickness at a first location of the low friction layer 1104 can be different than a thickness at a second location therealong. The low friction layer 1104 (or second low friction layer 1104') may overlie one major surface of the substrate 1119, shown, or overlie both major surfaces. The substrate 1119 may be at least partially encapsulated by the low friction layer 1104 and second low friction layer 1104'. That is, the low friction layer 1104 may cover at least a region of the substrate 1119. Axial surfaces of the substrate 1119 may or may not be exposed from the low friction layer 1104. The thickness of the friction layer 1104 can be identical to the thickness of the second low friction layer 1104'. The thickness of the friction layer 1104 can be different from the thickness of the second low friction layer 1104'.

In an embodiment, the composite material 1000 can have a thickness, $T_{SW}$, in a range of 0.1 mm and 5 mm, such as in a range of 0.2 mm and 3 mm, or even in a range of 0.3 mm and 2 mm. It will be further appreciated that the thickness, $T_{SW}$ of the composite material 1000 may be any value between any of the minimum and maximum values noted above. The thickness, $T_{SW}$ of the composite material 1000 may be uniform, i.e., a thickness at a first location of the composite material 1000 can be equal to a thickness at a second location therealong. The thickness, $T_{SW}$ of the composite material 1000 may be non-uniform, i.e., a thickness at a first location of the composite material 1000 can be different than a thickness at a second location therealong.

In an embodiment as stated above, under step 14 of FIG. 1, the substrate material may be partially or fully embedded into a layer of low-friction material or low friction layer 1104. Possible processes used to manufacture the composite material are milling, pressing, extrusion, molding, sintering, or may be embedded a different way. Any of the layers of the composite material 1000 as described above, may be laminated together or otherwise formed such that they at least partially overlap one another, as described above. The low friction layer(s) 1104, 1104' may be laminated onto or otherwise overlie a surface of the substrate 1119 or another intervening layer, as described above. The sheet may be formed into a substrate 1119 having radial inner and outer surfaces. Low friction layer(s) 1104, 1104' may encapsulate the substrate 1119 such that at least one of the radial inner and outer surfaces of the substrate 1119 may be located within the low friction layer(s) 1104, 1104'. In a number of embodiments, depending on the fillers of the low friction layer(s) 1104, 1104' the composite material 1000 may have a lower surface-related electric conductivity up to a non-conductive surface towards at least one side of the composite material 1000.

Referring now to the third step 16 of the manufacturing process 10 as shown in FIG. 1, according to certain embodiments, forming the composite material 1000 into a bearing may include gluing the low friction layer(s) 1104, 1104' or any intervening layers can to the substrate 1119 using a melt adhesive to form a preform. The preform can be cut into blanks that can be formed into the bearing. The cutting of the preform into a blank may include use of a stamp, press, punch, saw, deep drawing, or may be machined in a different way. Cutting the preform into a blank can create cut edges including an exposed region of the substrate 1119. The blanks can be formed into the bearing, such as by rolling and flanging the preform to form a semi-finished bearing of a desired shape. The forming of the bearing from the blank may include use of a stamp, press, punch, saw, deep drawing, or may be machined in a different way. In some embodiments, the edges of the blank may be bent into a flange in a secondary operation. In other embodiments, the bearing may be formed through a single operation process including forming the flange. The bearing may be formed as a single unit or unitary piece of material.

Figure 3A:
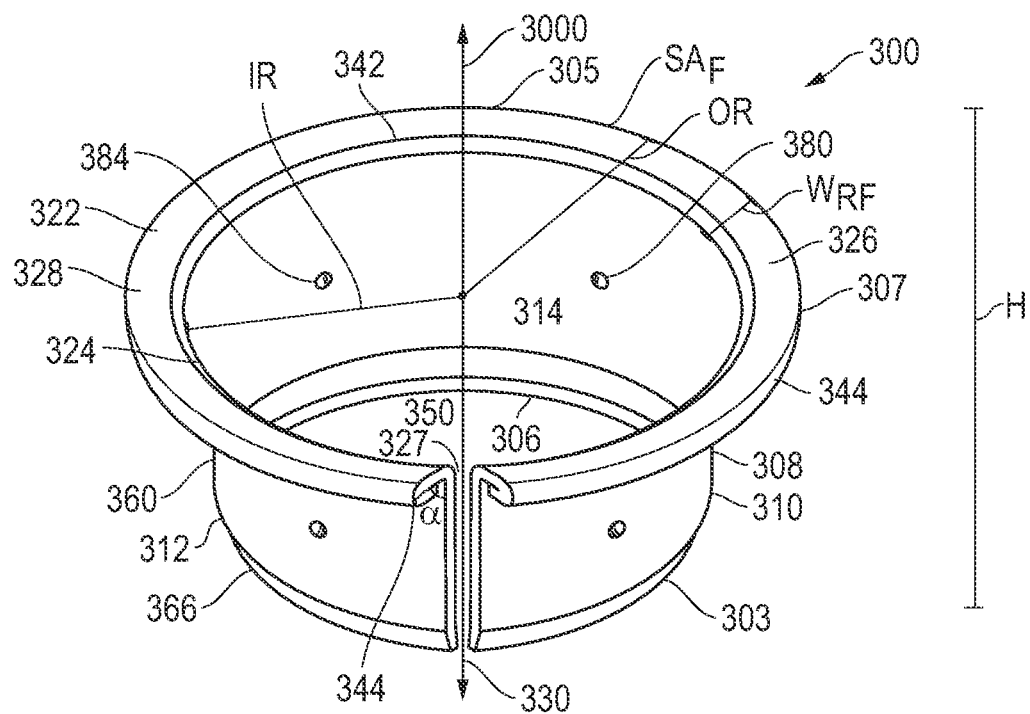
FIG. 3A is an illustration of a perspective top view of bearing according to a number of embodiments.
Figures 3B, 3C:
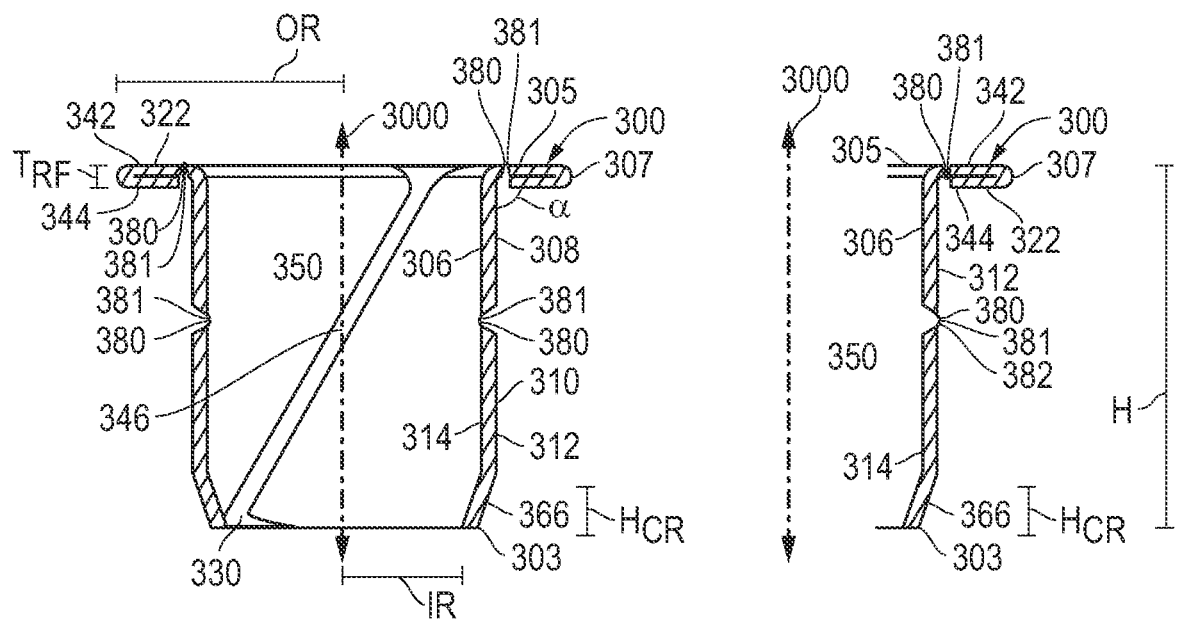
FIG. 3B is an illustration of a radial cross-sectional view of a bearing according to a number of embodiments.
FIG. 3C is an illustration of a radial cross-sectional view of a bearing according to a number of embodiments.

For purposes of illustration, FIGS. 3A-C show a bearing (generally designated 300) that can be formed from the blanks. In a number of embodiments, the bearing 300 shown in FIGS. 3A-C may be produced by rolling of an appropriately dimensioned piece of composite material 1000, which may be initially present as a blank as described above. FIG. 3A illustrates a top perspective view of a bearing 300 that can be formed as described by the forming process above. FIG. 3B illustrates a radial cross-sectional view of a bearing 300 that can be formed as described by the forming process above. FIG. 3C illustrates a close up radial cross-sectional view of a bearing 300 that can be formed as described by the forming process above.

Referring now to FIGS. 3A-3C, in a number of specific embodiments, the bearing may be a plain bearing 300. In a number of embodiments, the bearing 300 may be a sliding bearing. The bearing 300 may extend in the axial direction relative to a central axis 3000. The central axis 3000 is oriented longitudinally extending along the length of the bearing 100. The bearing 300 may include a bearing sidewall 308. The sidewall 308 may include a substrate 1119 and at least one low friction layer 1104 of the composite material 1000 as shown in FIGS. 2A-2C. In a number of embodiments, the sidewall 308 may include an outward face 312 and an inward face 314. The sidewall 308 may include a generally cylindrical body 310 that may form an annular shape having a first axial end 303 and a second axial end 305, as viewed in longitudinal cross-section. As used herein, "generally cylindrical" refers to shape which, when positioned in a best fit cylinder having a body of revolution about an axis, deviates from the best fit cylinder by no greater than 15% at any location, no greater than 10% at any location, no greater than 5% at any location, no greater than 4% at any location, no greater than 3% at any location, no greater than 2% at any location, or no greater than 1% at any location. In an embodiment, "generally cylindrical" may refer to the generally cylindrical body 310 as assembled between inner and outer components—i.e., in the installed state. In another embodiment, "generally cylindrical" may refer to the generally cylindrical body 310 prior to assembly between inner and outer components—i.e., in the uninstalled state. In a particular embodiment, the generally cylindrical sidewall may be a cylindrical sidewall having a shape corresponding to a revolution about an axis with two longitudinal planar end sections. In a particular embodiment, the cylindrical sidewall may have nominal surface roughness, such as for example, caused during typical machining and fabrication processes.

The bearing 300 may have an outer radial end 307 and an inner radial end 306. The bearing 300 may have an annular shape that is substantially L shaped. In other words, the bearing 300 may have an L bearing cross-section extending in the radial and axial direction as shown best in FIG. 3C. Other annular shapes of the bearing are possible. The opposite ends of a rolled piece of the composite material 1000 forming the bearing 300 may be bound at an axial gap 330 that extends in the axial direction along the generally cylindrical body 310. Axial gaps 330 extending nonlinearly and/or obliquely (i.e. diagonally) to the central axis 3000 of the bearing 300 are also possible, as shown best in FIG. 3B. In a number of particular embodiments, the axial gap 330 may be welded or otherwise coupled by other means to form a closed bearing 300. In some embodiments, the axial gap 330 may be left uncoupled. The bearing 300 may include a bore 350 extending along the axial length of the bearing 300 and adapted to house an internal component of an assembly. The bore 350 may be parallel or non-parallel to the central axis 3000. The bore 350 may be formed by bending a planar composite material 1000 into a generally cylindrical shape forming the generally cylindrical body 310 and sidewall 308.

The bearing 300 sidewall 308 may further include at least one flange 322. The flange 322 can be generally annular about the central axis 3000. The flange 322 may project radially outwardly from at least one of the first axial end 303 or the second axial end 305. The flange 322 may extend radially outward from the inner radial end 306 to the outer radial end 307. Alternatively, the flange 322 may extend radially inward from outer radial end 307 to the radially inner end 307 (not shown). In a number of embodiments, the flange 322 may form a generally planar outermost axial surface at the outer radial end 307 of the bearing 300. In a number of embodiments, the flange 322 may be formed with a low friction layer 1104 or low friction material formed at the outermost axial surface at the outer radial end 307 of the bearing 300. In some embodiments, the flange 322 may be positioned at the second axial end 305 of the bearing 300. In a number of embodiments, the outer radial end 307 may form the outer radius OR of the bearing 300 when measured radially from the central axis 3000. In a number of embodiments, the inner radial end 306 may form the inner radius IR of the bearing 300 when measured radially from the central axis 3000. In other words, a radial width of the flange 322 $W_{RF}$ may be the distance from the difference in distance of the outer radius OR and the inner radius IR. In a number of embodiments, the flange 322 may include an axial split 327. The axial split 327 may provide a gap in the flange 322. In a number of embodiments, the flange 322 may include a plurality of axial splits 327 providing a segmented flange (not shown). In certain embodiments, as shown in FIGS. 3A-3B, the axial split 327 can be contiguous with the axial gap 330 in the generally cylindrical body 310. In other embodiments, the axial split 327 can be non-contiguous with the axial gap 330 in the generally cylindrical body 310.

In a number of embodiments, as shown in FIGS. 3A-3B, the bearing 300 may have an overall inner radius, IR, from the central axis 3000 to the inner radial end 306, and IR can be mm, such as 5 mm, 10 mm, 15 mm, 20 mm, or 50 mm. The inner radius IR can be ≤100 mm, such as ≤50 mm, ≤25 mm, ≤10 mm, ≤5 mm, or ≤1 mm. The inner radius IR may vary along the circumference of the bearing 300. In a number of embodiments, the bearing 300 can have an overall inner radius, IR, of between about 2 to 50 mm. It will be appreciated that the bearing 300 can have an overall inner radius, IR, which may be within a range between any of the minimum and maximum values noted above. It will be further appreciated that the bearing 300 can have an overall inner radius, IR, which may be any value between any of the minimum and maximum values noted above.

In a number of embodiments, as shown in FIGS. 3A-3B, the bearing 300 may have an overall outer radius, OR, from the central axis 3000 to the outer radial end 307, and OR can be ≥1.5 mm, such as ≥5 mm, ≥10 mm, ≥20 mm, ≥40 mm, or ≥70 mm. The outer radius OR can be ≤125 mm, such as ≤100 mm, ≤75 mm, ≤50 mm, ≤25 mm, or ≤10 mm. The overall outer radius, OR, may vary along the circumference of the bearing 300. In a number of embodiments, the bearing 300 can have an overall outer radius, OR, of between about 3 to 60 mm. It will be appreciated that the bearing 300 can have an overall outer radius, OR, that may be within a range between any of the minimum and maximum values noted above. It will be further appreciated that the bearing 300 can have an overall outer radius, OR, that may be any value between any of the minimum and maximum values noted above. Further, as stated above, the radial width of the flange 322, $W_{RF}$, may be the distance from the difference in distance of the outer radius OR and the inner radius IR.

In a number of embodiments, as shown in FIGS. 3A-3C, the bearing 300 can have an overall height, H, from first axial end 303 to the second axial end 305, and H can be ≥0.5 mm, ≥1 mm, ≥2 mm, ≥5 mm, ≥10 mm, or ≥50 mm. The height, H, can be ≤500 mm, such as ≤250 mm, ≤150 mm, ≤100 mm, or ≤50 mm. In a number of embodiments, the bearing 300 can have an overall height, H, of between about 5 to 50 mm. It will be appreciated that the bearing 300 can have an overall height, H, which may be within a range between any of the minimum and maximum values noted above. It will be further appreciated that the bearing 300 can have an overall height, H, which may be any value between any of the minimum and maximum values noted above.

In a number of embodiments, as shown in FIG. 3B, the at least one flange 322 may be contiguous with and extend from an axial end 303, 305 of the generally cylindrical body 310 of the bearing 300. In an embodiment, the flange 322 may be positioned to project orthogonal to the generally cylindrical body 310. In other embodiments, the flange 322 may be positioned to project non-orthogonal to the generally cylindrical body 310. In some embodiments, the flange 322 may form an angle α with the generally cylindrical body 310 (and the central axial 3000). Angle α may be in α range from at least 0° to 180°. The angle α may be 30° or greater, such as 45° or greater, 55° or greater, or 85° or greater. The angle α may be 150° or less, such as 135° or less, 120° or less, 90° or less, or 60° or less. In a number of specific embodiments, the angle α may be in a range of 60° to 120°.

Referring now to FIGS. 3A-3C, the bearing 300 can generally include a flange 322 may have a multiple wall construction defining one or more flange sidewalls 342, 344. In a number of embodiments, the first axial end 303 of the bearing 300 may include a flange 322 having flange sidewalls 342, 344. Alternatively, the second axial end 305 of the bearing may include a flange 322 having flange sidewalls 342, 344. Alternatively still, both axial ends 303, 305 of the bearing may include a flange 322 having flange sidewalls 342, 344. As used herein, "multiple wall construction" refers to a sidewall including multiple flange sidewalls that overlie each other. In an embodiment, the multiple sidewalls contact each other. The multiple wall construction may be shaped such that a line extending axially parallel to the central axis 3000 of the bearing 300 intersects two or more discrete flange sidewalls 342, 344 along at least one radial position perpendicular to the central axis 300. In other words, the flange 322 may be folded upon itself to form multiple flange sidewalls 342, 344. The flange sidewalls 342, 344 can be formed by shaping a portion of the sidewall 308. More particularly, the flange sidewalls 342, 344 can be at least partially formed by folding an axial end of the sidewall 308 toward an opposite axial end of the sidewall 308. In accordance with one or more embodiments, the flange sidewalls 342, 344 can fold toward at least one of the first axial end 303 or the second axial end 305. Alternatively, the flange sidewalls 342, 344 can fold toward the axial center 346 of the bearing 300.

In embodiments where the flange sidewalls 342, 344 may be formed from a composite material 1000 including, for example, a substrate 1119 and a low friction layer 1104, the preform is considered as one discrete flange sidewall 342, 344. The multiple wall construction can include three axially adjacent flange sidewalls, four axially adjacent flange sidewalls, five axially adjacent flange sidewalls, or even six axially adjacent flange sidewalls. In accordance with an embodiment, the multiple wall construction can include no greater than 10 axially adjacent flange sidewalls, such as no greater than 5 axially adjacent flange sidewalls, or even no greater than 3 axially adjacent flange sidewalls. In an embodiment, the bearing 300 can have a multiple wall construction such that the flange sidewalls 342, 344 may be in contact with each other along at least 25% of a radial length of the flange 322, such as along at least 50% of the radial length of the flange 322, at least 60% of radial length of the flange 322, along at least 75% of the radial length of the flange 322, at least 80% of the radial length of the flange 322, or even at least 85% of the radial length of the flange 322. In another embodiment, the bearing 300 can have a multiple wall construction such that the flange sidewalls 342, 344 may be in contact with each other along less than 100% of the radial length of the flange 322, such as no greater than 99% of the axial length, no greater than 98% of the radial length of the flange 322, no greater than 97% of the radial length of the flange 322, no greater than 96% of the radial length, no greater than 95% of the radial length of the flange 322, or even no greater than 90% of the radial length of the flange 322. In a number of embodiments, the flange 322 may have a multiple wall construction such that the flange sidewalls 342, 344 may be in contact with each other around at least 180° of the circumference of the bearing 300, such as at least 210° of the circumference of the bearing 300, 240° of the circumference of the bearing 300, 270° of the circumference of the bearing 300, 300° of the circumference of the bearing 300, or even 360° of the circumference of the bearing 300.

In an embodiment, at least one of the flange sidewalls 342, 344 of the flange 322 can define at least one compression feature having a spring effect, i.e., the flange sidewalls 342, 344 can allow for absorption of a tolerance or misalignment between inner and outer components, e.g., between a shaft and a bore. In an embodiment, the spring effect can be derived from the material properties of the sidewall 308, including the material properties of the flange sidewalls 342, 344.

In a number of embodiments, as shown in FIG. 3B, the flange 322 can have a thickness, $T_{RF}$, of between about 0.2 mm to about 10 mm, such as between about 0.75 mm and about 8 mm, such as between about 1 mm and about 5 mm, such as between about 1.5 mm and about 4 mm. In a number of embodiments, the flange 322 can have a thickness, $T_{RF}$, of between about 0.7 to 5 mm. It will be appreciated that the flange 322 can have a thickness, $T_{RF}$, which may be within a range between any of the minimum and maximum values noted above. It will be further appreciated that the flange 322 can have a thickness, $T_{RF}$, which may be any value between any of the minimum and maximum values noted above. It may also be appreciated that the thickness, $T_{RF}$, of the flange 322 may vary around the circumference of the bearing 300.

In a number of embodiments, as shown in FIGS. 3A-3C, the generally cylindrical body 310 may include at least one coining region 366, which may be oriented in the radial direction. The at least one coining region 366 may provide more stiffness for the generally cylindrical body 310 or the flange 322. In a number of embodiments, the coining region 366 may provide a lead-in support for easy assembly and stiffness support for at least one of the generally cylindrical body 310 or the flange 322. The coining region 366 may include at least one undulation, depression, groove, trough, plateau, ramp, projection, or deformation in the axial direction. The coining region 366 may have a circular, polygonal, oval, or semi-circular cross-sectional shape. In a number of embodiments, the coining region 366 may be located on the generally cylindrical body 310. In a number of embodiments, the coining region 366 may be disposed in the axial distance between the first axial end 303 and the second axial end 305. In a number of embodiments, the coining region 366 may be at the first axial end 303 or the second axial end 305. In other words, the coining region 366 may extend anywhere along the circumference of the generally cylindrical body 310. In one embodiment, the coining region 366 may be in the shape of a deformation in a radial direction so the generally cylindrical body 310 may be non-parallel to the central axis 3000 of the bearing 300 as shown in FIG. 3A. The coining region 366 may be deformed radially outward or radially inward from a line parallel to the central axis 3000.

As shown best in FIG. 3B, the coining region 366 may have a height $H_{CR}$. The height $H_{CR}$ may have a relationship with the height H of the bearing 300 such that $H_{CR} \geq 0.3$ H, such as $\geq 0.25$ H, $\geq 0.20$ H, $\geq 0.15$ H, $\geq 0.10$ H, or $\geq 0.05$ H. In another aspect, height $H_{CR}$ can be $\leq 0.5$ H, such as $\leq 0.45$ H, $\leq 0.40$ H, $\leq 0.35$ H, $\leq 0.30$ H, $\leq 0.25$ H, $\leq 0.20$ H, $\leq 0.15$ H, $\leq 0.10$ H, or $\leq 0.01$ H. The height $H_{CR}$ of the coining region 366 may vary along the circumference of the bearing 300 about the central axis 3000.

In a number of embodiments, the sidewall 308 of the bearing 300 or the bearing itself may be coated such that the low friction layer 1104 or low friction material may overlie the metal layer on at least one of the radially inner surface 314 and a radially outer surface 312 of the sidewall 308. In a number of embodiments, the sidewall 308 of the bearing 300 may include at least one conductive region 380. The conductive region 380 may be free of the low friction layer 1104 or low friction material. The conductive region 380 may allow for conductivity between the bearing 300 and one of the other components of an assembly. The conductive region 380 may include a plurality of conductive regions. In an embodiment, the conductive region 380 may include an outward conductive region 382 on the sidewall 308. In an embodiment, the conductive region 380 may include an inward conductive region 384 on the sidewall 308. In an embodiment, the conductive region 380 may include both an inward conductive region 384 and outward conductive region 382. The conductive region 380, inward conductive region 384, or outward conductive region 382 may include a deformed notch 381 at least partially free of low friction material/layer 1104 and receding radially internally or radially externally from the sidewall 308. In a number of embodiments, at least one of conductive region 380, inward conductive region 384, or outward conductive region 382 may expose the substrate 1119. As used herein "radially internally" may be defined as the sidewall 308 on the internal side of the bearing 300 facing the bore 350 from the first axial end 303 to the second axial 308 at the outer radial end 307 (e.g. the radially inner surface 314 of the sidewall 308). As used herein "radially externally" may be defined as the sidewall 308 on the external side of the bearing 300 not facing the bore 350 from the first axial end 303 to the second axial 308 at the outer radial end 307 (e.g. the radially outer surface 312 of the sidewall 308). In a number of embodiments, at least one of conductive region 380, inward conductive region 384, or outward conductive region 382 may include a protrusion at least partially free of low friction layer 1104 or low friction material and extending radially internally or radially externally from the sidewall 308. In a number of embodiments, at least one of conductive region 380, inward conductive region 384, or outward conductive region 382 may include a deformed notch 381 at least partially free of low friction layer 1104 or low friction material and receding radially internally or radially externally from the sidewall 308. In at least one embodiment, at least one of the conductive region 380, inward conductive region 384, or outward conductive region 382 may be located along the generally cylindrical body 310.

The conductive region 380, inward conductive region 384, or outward conductive region 382 may be formed from the composite material 1000 via a manufacturing process that may include use of a cutting, skiving, stamping, pressing, punching, sawing, deep drawing, edging, milling, or may be machined in a different way. In some embodiments, the conductive region 380, inward conductive region 384, or outward conductive region 382 may be formed through a single operation process or multiple operation process. By non-limiting example, a punch may be used to plastically deform the generally cylindrical body 310 either radially inwardly or outwardly and remove the low friction material exposing the substrate 1119 to create the conductive region 380.

The conductive region 380, inward conductive region 384, or outward conductive region 382 may have a surface area of the bearing sidewall 308 that may be ≥0.1 mm², such as ≥0.5 mm², ≥1 mm², ≥5 mm², ≥25 mm², or ≥50 mm². The conductive region 380, inward conductive region 384, or outward conductive region 382 may have a surface area of the bearing sidewall 308 that can be ≤200 mm², such as ≤100 mm², ≤50 mm², ≤25 mm², ≤10 mm², or ≤1 mm². It will be appreciated that the conductive region 380, inward conductive region 384, or outward conductive region 382 may have a surface area of the bearing sidewall 308, which may be within a range between any of the minimum and maximum values noted above. It will be further appreciated that the conductive region 380, inward conductive region 384, or outward conductive region 382 may have a surface area of the bearing sidewall 308, which may be any value between any of the minimum and maximum values noted above.

In a number of embodiments, as stated above, the bearing 300 may be included in an assembly 2000. The assembly 2000 may further include an inner component, such as a shaft 28. The assembly 2000 may further include an outer component, such as a housing 30. The assembly 2000 may include a bearing 300 disposed radially between the inner component and the outer component. In a number of embodiments, the bearing 300 may be disposed between the inner component 28 and the outer component 30 such that the bearing surrounds the inner component or shaft 28. The bearing 300 may have a sidewall 308 having a substrate 1119 and a low friction material 1104 extending along a radially inner surface 314 and a radially outer surface 312 of the sidewall 308. The sidewall 308 may have generally cylindrical body 310 and at least one flange 322 contiguous with and extending from an axial end 303, 305 of the generally cylindrical body 310. The flange 322 may have a multiple wall construction including a plurality of flange sidewalls 342, 344 in contact with each other along at least 25% of a radial length of the flange 322, and/or the sidewall 308 may include an outward conductive region 382 and an inward conductive region 384.

Figure 4:
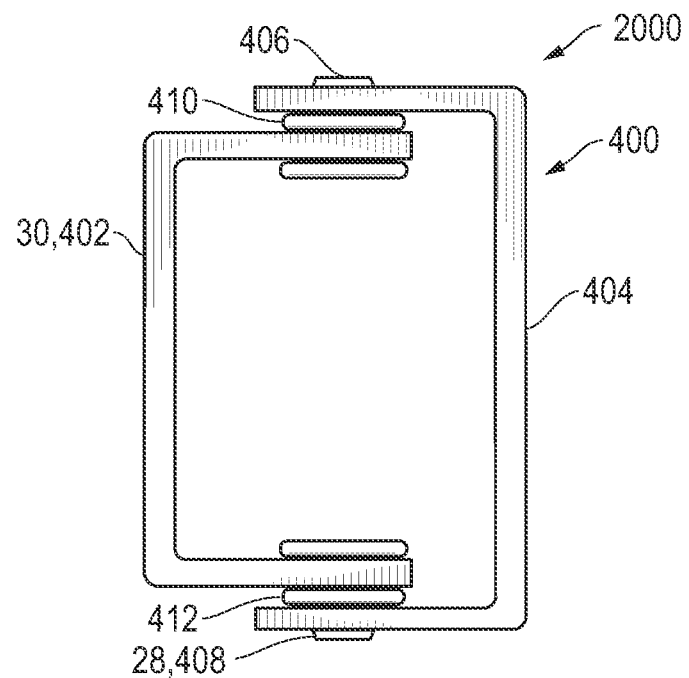
FIG. 4 is an illustration of a bearing within an assembly according to a number of embodiments.
Figure 5:
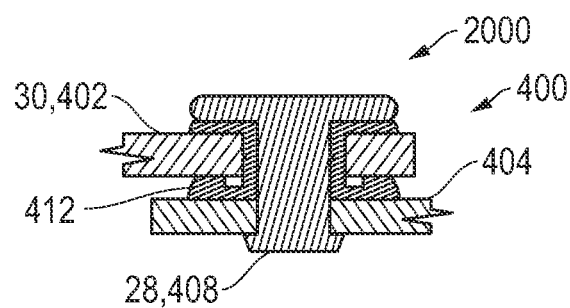
FIG. 5 is an illustration of a bearing within an assembly according to a number of embodiments.

FIGS. 4 and 5 illustrate an assembly 2000 in the form of an exemplary hinge 400, such as an automotive door hinge, hood hinge, engine compartment hinge, and the like. Hinge 400 can include an inner component 28 (such as an inner hinge region 402) and an outer hinge region 404. Hinge regions 402 and 404 can be joined by outer components 30 (such as rivets 406 and 408) and bearings 410 and 412. Bearings 410 and 412 can be bearings as previously described and labeled 300 herein. FIG. 5 illustrates a cross section of hinge 400, showing rivet 408 and bearing 412 in more detail.

FIG. 6 illustrates an assembly 2000 in the form of another exemplary hinge 600. Hinge 600 can include a first hinge region 602 and a second hinge region 604 joined by a pin 606 and a bearing 608. Bearing 608 can be a bearing as previously described and labeled 300 herein.

In an exemplary embodiment, FIG. 7 depicts a non-limiting example of an assembly 2000 in the form of an embodiment of another hinge assembly 700 including the parts of a disassembled automobile door hinge including bearing 704. FIG. 7 is an example of a profile hinge. The bearing 704 may be inserted in hinge door part 706. Bearing 704 can be a bearing as previously described and labeled 300 herein. Rivet 708 bridges the hinge door part 706 with hinge generally cylindrical body part 710. Rivet 708 may be tightened with hinge generally cylindrical body part 710 through set screw 712 and hold in place with the hinge door part 706 through washer 702.

FIG. 8 illustrates an assembly 2000 in the form of an exemplary headset assembly 800 for a two-wheeled vehicle, such as a bicycle or motorcycle. A steering tube 802 can be inserted through a head tube 804. Bearings 806 and 808 can be placed between the steering tube 802 and the head tube 804 to maintain alignment and prevent contact between the steering tube 802 and the head tube 804. Bearings 806 and 808 can be bearings as previously described and labeled 300 herein. Additionally, seals 810 and 812 can prevent contamination of the sliding surface of the bearing by dirt and other particulate matter.

Such assemblies noted above are all exemplary and are not meant to limit the use of the bearing 300 in potential other assemblies. For example, the bearing 300 may be used in an assembly 2000 for a powertrain assembly application (such as belt tensioners) or other assembly applications with limited space.

In an embodiment, the bearing 300 can provide an axial tolerance compensation of at least 0.01 mm in an axial direction relative to the inner component or outer component, such as at least 0.05 mm, at least 0.1 mm, at least 0.5 mm, at least 1 mm, at least 2 mm, or even at least 5 mm. "Axial tolerance compensation" may be defined as the distance the flange 322 of the bearing 300 provides in axial adjustment of sizes between neighboring axial components.

The method of forming the bearing 300 may include providing a blank. The bearing 300 may be formed from a blank including a preform including a substrate 1119 and a low friction layer 1104 overlying the substrate 1119. The method may further include forming a bearing 300 from the blank, the bearing having a sidewall 308, wherein the low friction material 1104 extends along a radially inner surface 314 and a radially outer surface 312 of the sidewall 308, the sidewall further including a generally cylindrical body 310; and a flange 322 contiguous with and extending from an axial end of the generally cylindrical body 310, where at least one of 1) the flange 322 may have a multiple wall construction including a plurality of flange sidewalls 342, 344 in contact with each other along at least 25% of a radial length of the flange, or 2) the sidewall 308 includes an outward conductive region 382 and an inward conductive region 384.

In a number of embodiments, the assembly 2000 may be coated using a coating process. The coating process may include a painting process such as an e-painting process. The coating process may provide a coating 95 deposited on an exterior surface of at least one component of the assembly 2000 (e.g., bearing 300, inner component 28, outer component 30). In a number of embodiments, the bearing including an outward conductive region and an inward conductive region may enable the coating to stick to the components of the assembly 2000 by providing the appropriate conductivity between the individual components. For example, the bearing 300 having a flange 322 having a multi-wall construction and/or the sidewall 308 including an outward conductive region 382 and an inward conductive region 384 may cause conductivity between a car door (outer component 30) and the remaining car body (inner component 28).

Applications for such embodiments include, for example, assemblies 1000 for hinges and other vehicle components. Further, use of the bearing 300 or assembly 2000 may provide increased benefits in several applications such as, but not limited to, vehicle tail gates, door frames, seat assemblies, powertrain applications (such as belt tensioners), or other types of applications. According to embodiments herein, the flanges of the bearings may provide desired axial preload and improved axial tolerance compensation compared to existing bearings known in the art. Further, according to embodiments herein, the bearing may provide appropriate conductivity between different components of the assembly for efficient coating/e-painting of the assembly without creating excess debris. Further, according to embodiments herein, the bearings may be a simple installation, be retrofit, and provide cost effective across several possible assemblies of varying complexity. As a result, these designs can significantly reduce noise, harshness, ineffective paint design, and vibration properties while providing improved torque performance, thereby increasing lifetime and improving effectiveness and performance of the assembly, the bearing, and its other components.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1. A bearing comprising: a sidewall comprising an open metal substrate at least partially embedded in a low friction material, the sidewall further comprising: a generally cylindrical body; and a flange contiguous with and extending from an axial end of the generally cylindrical body, wherein at least one of 1) the flange comprises a multiple wall construction comprising a plurality of flange sidewalls in contact with each other along at least 25% of a radial length of the flange, or 2) the sidewall or the flange comprises an outward conductive region and an inward conductive region.

Embodiment 2. An assembly comprising: an inner component; an outer component; and a bearing disposed radially between the inner component and the outer component, wherein the bearing comprises: a sidewall comprising an open metal substrate at least partially embedded in a low friction material, the sidewall further comprising: a generally cylindrical body; and a flange contiguous with and extending from an axial end of the generally cylindrical body, wherein at least one of 1) the flange comprises a multiple wall construction comprising a plurality of flange sidewalls in contact with each other along at least 25% of a radial length of the flange, or 2) the sidewall or the flange comprises an outward conductive region and an inward conductive region.

Embodiment 3. The method comprising: providing a blank comprising an open metal substrate at least partially embedded in a low friction material; forming a bearing from the blank, the bearing comprising a sidewall comprising: a generally cylindrical body; and a flange contiguous with and extending from an axial end of the generally cylindrical body, wherein at least one of 1) the flange comprises a multiple wall construction comprising a plurality of flange sidewalls in contact with each other along at least 25% of a radial length of the flange, or 2) the sidewall or the flange comprises an outward conductive region and an inward conductive region.

Embodiment 4. The bearing, assembly, or method of any one of the preceding embodiments, wherein at least one of the outward conductive region or the inward conductive region comprises a deformed notch at least partially free of low friction material and receding radially internally or radially externally from the sidewall.

Embodiment 5. The bearing, assembly, or method of any one of the preceding embodiments, wherein at least one of the outward conductive region or the inward conductive region comprises a protrusion at least partially free of low friction material and extending radially internally or radially externally from the sidewall.

Embodiment 6. The bearing, assembly, or method of any one of the preceding embodiments, wherein the low friction material overlies a surface of the substrate.

Embodiment 7. The bearing, assembly, or method of embodiment 6, wherein the low friction material overlies both a radially outer surface and a radially inner surface of the substrate.

Embodiment 8. The bearing, assembly, or method of any one of the preceding embodiments, wherein the substrate comprises a woven metal mesh or expanded metal.

Embodiment 9. The bearing, assembly, or method of embodiment 8, wherein the metal of the substrate is selected from the group of bronze, copper, aluminum, messing, or stainless steel.

Embodiment 10. The bearing, assembly, or method of any one of the preceding embodiments, wherein the low friction material comprises a polymer.

Embodiment 11. The bearing, assembly, or method of any one of the preceding embodiments, wherein at least one of the outward conductive region or the inward conductive region is located on the generally cylindrical body.

Embodiment 12. The bearing, assembly, or method of any one of the preceding embodiments, wherein at least one of the outward conductive region or the inward conductive region is located on the flange.

Embodiment 13. The bearing, assembly, or method of any one of the preceding embodiments, wherein at least one of the outward conductive region or the inward conductive region exposes the substrate.

Embodiment 14. The bearing, assembly, or method of any one of the preceding embodiments, wherein the generally cylindrical body comprises a gap extending at least partially between a first and a second axial end of the bearing.

Embodiment 15. The bearing, assembly, or method of any one of the preceding embodiments, wherein the flange comprises a split.

Embodiment 16. The bearing, assembly, or method of any one of the preceding embodiments, wherein the multiple wall construction comprises 2 flange sidewalls.

Embodiment 17. The bearing, assembly, or method of embodiment 16, wherein the multiple wall construction comprises at least 3 flange sidewalls, such as at least 4 flange sidewalls, or even at least 5 flange sidewalls.

Embodiment 18. The bearing, assembly, or method of embodiment 16, herein the multiple wall construction comprises no greater than 5 flange sidewalls, such as no greater than 4 flange sidewalls, or even no greater than 3 flange sidewalls.

Embodiment 19. The bearing, assembly, or method of any one of the preceding embodiments, wherein the flange has a multiple wall construction around at least 180° of a circumference of the bearing.

Embodiment 20. The bearing, assembly, or method of any one of the preceding embodiments, wherein the flange has a generally planar outermost axial surface.

Embodiment 21. The bearing, assembly, or method of any one of the preceding embodiments, wherein the flange is formed with the low friction material facing an outermost axial surface.

Embodiment 22. The bearing, assembly, or method of any one of the preceding embodiments, wherein the substrate is fully embedded in the low friction material such that the low friction material extends along at least a portion of the radially inner and radially outer surfaces of the substrate.

Note that not all of the features described above are required, that a region of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, however, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A bearing comprising:
a sidewall comprising an open metal substrate at least partially embedded in a low friction material such that low friction material overlies the metal substrate and forms the radially inner surface and radially outer surface of the sidewall, the sidewall further comprising:
a generally cylindrical body; and
a flange contiguous with and extending from an axial end of the generally cylindrical body, wherein at least one of 1) the flange comprises a multiple wall construction at least partially formed by folding the axial end of the sidewall toward an opposite axial end of the sidewall, wherein the flange comprises a plurality of flange sidewalls in contact with each other along at least 25% and no greater than 95% of a radial length of the flange, wherein the flange sidewalls contact each other in the radial direction, wherein the flange is located at an axial end of the bearing, or 2) wherein the open metal substrate is exposed on a radially inner side and a radially outer side at a single point along the sidewall.

2. The bearing of claim 1, wherein the substrate comprises a woven metal mesh or expanded metal.

3. The bearing of claim 2, wherein the metal of the substrate is selected from the group of bronze, copper, aluminum, messing, or stainless steel.

4. The bearing of claim 1, wherein the low friction material comprises a polymer.

5. The bearing of claim 1, wherein the generally cylindrical body comprises a gap extending at least partially between a first and a second axial end of the bearing.

6. The bearing of claim 1, wherein the flange comprises a split.

7. The bearing of claim 1, wherein the flange has a multiple wall construction around at least 180° of a circumference of the bearing.

8. The bearing of claim 1, wherein the flange has a generally planar outermost axial surface.

9. The bearing of claim 1, wherein the flange is formed with the low friction material facing an outermost axial surface.

10. The bearing of claim 1, wherein the substrate is fully embedded in the low friction material such that the low friction material extends along at least a portion of the radially inner and radially outer surfaces of the substrate.

11. The bearing of claim 1, wherein the low friction material forms an outermost exterior surface of the flange.

12. An assembly comprising:
an inner component;
an outer component; and
a bearing disposed radially between the inner component and the outer component, wherein the bearing comprises:
a sidewall comprising an open metal substrate at least partially embedded in a low friction material such that low friction material overlies the metal substrate and forms the radially inner surface and radially outer surface of the sidewall, the sidewall further comprising:
a generally cylindrical body; and
a flange contiguous with and extending from an axial end of the generally cylindrical body, wherein at least one of 1) the flange comprises a multiple wall construction at least partially formed by folding the axial end of the sidewall toward an opposite axial end of the sidewall, wherein the flange comprises a plurality of flange sidewalls in contact with each other along at least 25% and no greater than 95% of a radial length of the flange, wherein the flange sidewalls contact each other in the radial direction, wherein the flange is located at an axial end of the bearing, or 2) wherein the open metal substrate is exposed on a radially inner side and a radially outer side at a single point along the sidewall.

13. A method comprising:
providing a blank comprising an open metal substrate at least partially embedded in a low friction material;
forming a bearing from the blank, the bearing comprising
a sidewall such that low friction material overlies the metal substrate and forms the radially inner surface and radially outer surface of the sidewall, the sidewall further comprising:
a generally cylindrical body; and
a flange contiguous with and extending from an axial end of the generally cylindrical body, wherein at least one of 1) the flange comprises a multiple wall construction at least partially formed by folding the axial end of the sidewall toward an opposite axial end of the sidewall, wherein the flange comprises a plurality of flange sidewalls in contact with each other along at least 25% and no greater than 95% of a radial length of the flange, wherein the flange sidewalls contact each other in the radial direction, wherein the flange is located at an axial end of the bearing, or 2) wherein the open metal substrate is exposed on a radially inner side and a radially outer side at a single point along the sidewall.

* * * * *